REFLEX CIRCUIT SYSTEM
Filed May 28, 1954
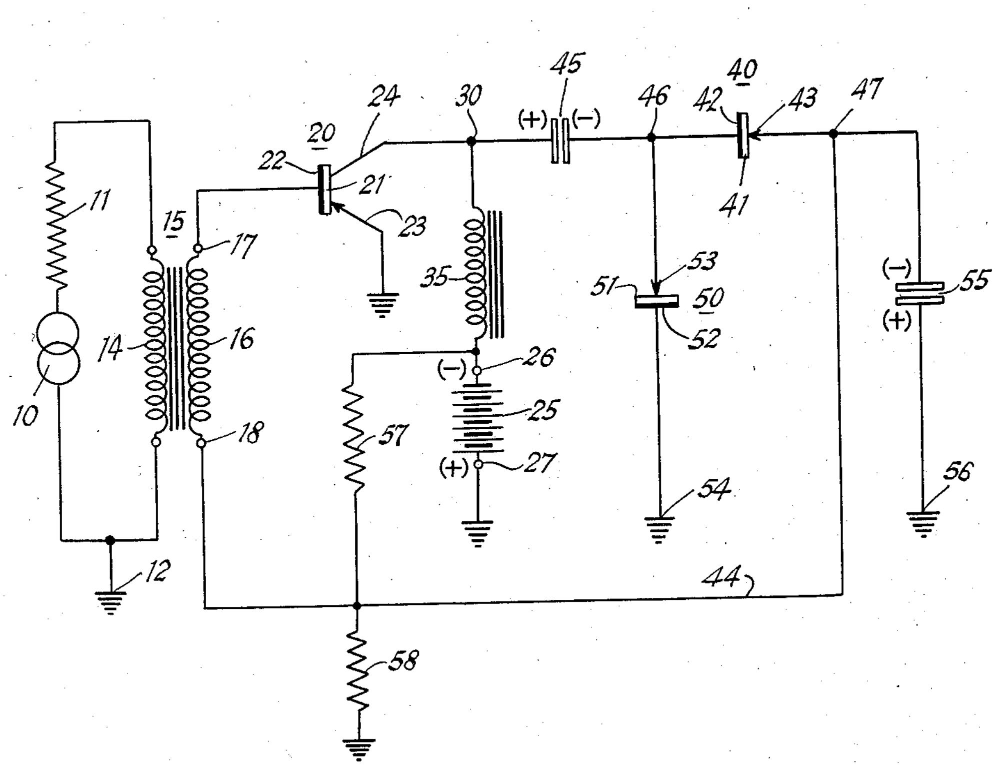
INVENTORS
David DeWitt
Harold Landon
BY Roland C. Wittenberg
[signature]
ATTORNEY 2,863,065

REFLEX CIRCUIT SYSTEM

David De Witt, Northport, Harold Sandler, Whitestone, and Roland C. Wittenberg, New Hyde Park, N. Y., assignors to Radio Receptor Company, Inc., Brooklyn, N. Y., a corporation of New York Application May 28, 1954, Serial No. 433,189

2 Claims. (Cl. 307—88.5)

This invention relates to electronic signal amplifier circuits and, more particularly, to a reflex amplification circuit utilizing transistor triodes and diodes.

Reflex circuits of the type to which the present invention is directed are of importance as amplifiers as they reduce the number of separate signal amplifier stages required to raise a small signal input to a level high enough to effect control operations. For example, in a reflex circuit of this type, an A. C. input signal is amplified and then rectified and, using the same circuit elements, the fed-back resultant rectified D. C. signal is again amplified. The reflex circuit thus achieves two stages of amplification, plus rectification, in a single stage.

However, reflex circuits as previously designed have been characterized by high power consumption, limited life of components, and complex design. These undesirable features have been due to the use of thermionic rectifiers and amplifiers, which not only have a limited life but also have high power consumption. Additionally, prior reflex circuits have not been capable, in a simple manner, of achieving the desired signal amplification.

The present invention is directed to a simple and economical reflex circuit characterized by substantially unlimited life of its components and an extremely low power consumption. These improvements are achieved by the use of transistor triodes and diodes in place of thermionic devices, and the provision of novel circuit interconnections. By these means, a small value A. C. input signal is amplified and rectified, and the rectified D. C. signal is re-amplified, with a minimum power consumption. The amplified D. C. signal is at a level sufficient to operate a control device such as a relay.

For an understanding of the invention principles, reference is made to the following description of a typical embodiment thereof as illustrated in the accompanying drawing. In the drawing the single figure is a schematic wiring diagram of a reflex circuit embodying the invention.

The theory of operation of transistors as diodes and triodes has been set forth at length in patents and published technical articles, and therefore no description will be given thereof, except as relates to their function in the circuit here under consideration.

Transistors are characterized by extremely low power consumption, substantially unlimited life, and favorable amplification ratios. For example, a signal current input to one electrode with a potential applied between the other two electrodes of a triode transistor, results in an output current, through one of the other electrodes, which is a multiple of the signal input current.

The reflex circuit of the present invention utilizes a transistor triode and a pair of diodes, which are either PNP or NPN type transistors. Referring to the drawing, an A. C. signal supplied from a generator 10 having an internal impedance 11 is applied to the primary winding 14 of a coupling transformer 15. The generator 10 and winding 14 are commonly grounded at 12.

The A. C. signal current coupled to the secondary winding 16 of transformer 15 is fed from terminal 17 to the base electrode 22 of a triode transistor 20 having a semi-conductor block 21. Emitter electrode 23 of transistor 20 is grounded, and collector electrode 24 is connected to a junction point 30. Junction point 30 is connected, in series with a relay operating coil 35, to negative terminal 26 of a course of D. C., such as a battery 25, having a grounded positive terminal 27.

Junction point 30 is also connected, through a condenser 45, to a second junction point 46. Point 46 is connected to the base electrode 42 of a diode 40 having a semi-conductor block 41. Point electrode 43 of transistor 40 is connected, through junction point 47 and conductor 44, to terminal 18 of secondary winding 16 of coupling transformer 15.

Point 46 is also connected to the point electrode 53 of a second diode transistor 50 having a semi-conductor block 51 and a base electrode 52 which is grounded at 54. Point 47 is connected to a condenser 55 grounded at 56.

Due to the amplifier action of transistor 20, the A. C. input signal current appears as an amplified current in collector electrode 24. The amplified A. C. signal current flows through relay operating coil 35, causing an A. C. potential to appear across coil 35. This A. C. voltage is applied to a voltage doubler combination including condensers 45 and 55 and diodes 40 and 50.

When the A. C. voltage across coil 35 is going positive, condenser 45 charges through diode transistor 50 to the polarity indicated. When the A. C. voltage across coil 35 is going negative, transistor diode 40 is conductive and transistor diode 50 is non-conductive. Condenser 55 charges through diode 40 to the polarity shown, and condenser 45 discharges through relay operating coil 35, power supply 25 and the ground into condenser 55. This provides a voltage doubling action for condenser 55.

The then negative side of condenser 55 is connected through point 47, conductor 44, and secondary winding 16 to base electrode 22 of transistor diode 20. Thus, the doubled D. C. voltage of condenser 55 is applied across transistor triode 20 between base electrode 22 and grounded emitter electrode 23, the then positive side of condenser 55 being also grounded. Base electrode 22 is thus negative with respect to emitter electrode 23, causing a D. C. current to flow through base 21 and base electrode 22 of transistor 20. Resistors 57 and 58 serve to place a small forward bias on the transistor base 22, in the absence of any signal from generator 10. It is necessary to have a small emitter current flowing, in order to realize full A. C. gain, when the signal from generator 10 is small. Resistors 57 and 58 also serve as a load to limit the effect of collector leakage current at high temperatures, which is a defect in present day germanium transistors.

This D. C. current is amplified by the current gain of transistor 20 acting as a grounded emitter amplifier stage. The amplified D. C. current flows from collector electrode 24 through relay operating coil 35, battery or power supply 25, ground, emitter electrode 23, and block 21 to collector electrode 24. The value of this current is sufficient to effectively energize relay operating coil 35.

The reflex circuit thus amplifies and rectifies the A. C. signal current, and then amplifies the rectified D. C. current to provide a current level sufficient to effectively energize the relay coil 35 to provide a control operation responsive to an A. C. signal input current.

While a specific embodiment of the invention has been shown and described in detail to illustrate the application of the invention principles, it will be understood that the invention may be embodied otherwise without departing from such principles.

What is claimed is:

1. A reflex circuit comprising, in combination, a transistor triode including a semi-conductor block, a base electrode, a collector electrode, and a grounded emitter electrode; a source of direct current having a grounded positive terminal; a direct current responsive load connected in series between the negative terminal of said source and said collector electrode; coupling means operable to couple an alternating current input signal to said base electrode to produce an amplified alternating current signal potential across said load; a rectifying and voltage doubling network including a first condenser connected to said collector electrode, a diode having a grounded negativet terminal, connected in charging relation with said first condenser, a grounded condenser, and a second diode connected in series between said condensers in charging relation with said grounded condenser; and means connecting the junction of said second diode and said grounded condenser in circuit relation with said base electrode for amplification of the rectified direct current, by said transistor triode operating as a grounded emitter amplification stage, to provide an operating current through said load.

2. A reflex circuit comprising, in combination, a transistor triode including a semi-conductor block, a base electrode, a collector electrode, and a grounded emitter electrode; a source of direct current having a grounded positive terminal; a direct current responsive load connected in series between the negative terminal of said source and said collector electrode; coupling means operable to couple an alternating current input signal to said base electrode to produce an amplified alternating current signal potential across said load; a rectifying and voltage doubling network including a first condenser connected to said collector electrode, a diode, having a grounded negative terminal, connected in charging relation with said first condenser, a grounded condenser, and a second diode connected in series between said condensers in charging relation with said grounded condenser; and means connecting the junction of said second diode and said grounded condenser in circuit relation with said base electrode through said coupling means for amplification of the rectified direct current, by said transistor triode operating as a grounded emitter amplification stage, to provide an operating current through said load.

References Cited in the file of this patent

UNITED STATES PATENTS

| | | |
|---|---|---|
| 2,205,243 | Dome | June 18, 1940 |
| 2,222,759 | Burnside | Nov. 26, 1940 |
| 2,620,448 | Wallace, Jr. | Dec. 2, 1952 |
| 2,663,800 | Herzog | Dec. 22, 1953 |
| 2,679,585 | Drazy | May 25, 1954 |
| 2,750,500 | Aiken | June 12, 1956 |

OTHER REFERENCES

Waidelick et al.: "Voltage-Multiplying Rectifiers," Proceedings of IRE, vol. 32, No. 8, August 1944.